United States Patent
Serov et al.

(10) Patent No.: US 10,038,196 B2
(45) Date of Patent: Jul. 31, 2018

(54) ACTIVE SUPPORT FOR CATHODE CATALYSTS

(71) Applicants: Alexey Serov, Albuquerque, NM (US); Plamen B Atanassov, Santa Fe, NM (US)

(72) Inventors: Alexey Serov, Albuquerque, NM (US); Plamen B Atanassov, Santa Fe, NM (US)

(73) Assignee: STC.UNM, Albuquerque, NM (US)

( * ) Notice: Subject to any disclaimer, the term of this patent is extended or adjusted under 35 U.S.C. 154(b) by 240 days.

(21) Appl. No.: 14/767,038

(22) PCT Filed: Feb. 11, 2014

(86) PCT No.: PCT/US2014/015849
§ 371 (c)(1),
(2) Date: Aug. 11, 2015

(87) PCT Pub. No.: WO2014/124452
PCT Pub. Date: Aug. 14, 2014

(65) Prior Publication Data
US 2015/0380741 A1 Dec. 31, 2015

Related U.S. Application Data

(60) Provisional application No. 61/763,405, filed on Feb. 11, 2013.

(51) Int. Cl.
*H01M 4/86* (2006.01)
*H01M 4/88* (2006.01)
*H01M 4/92* (2006.01)
*H01M 4/90* (2006.01)

(52) U.S. Cl.
CPC ....... *H01M 4/8605* (2013.01); *H01M 4/8803* (2013.01); *H01M 4/885* (2013.01); *H01M 4/8817* (2013.01); *H01M 4/8825* (2013.01); *H01M 4/8842* (2013.01); *H01M 4/8882* (2013.01); *H01M 4/9008* (2013.01); *H01M 4/9075* (2013.01); *H01M 4/921* (2013.01); *H01M 4/925* (2013.01); *H01M 2250/10* (2013.01); *H01M 2250/20* (2013.01); *H01M 2250/30* (2013.01); *Y02B 90/14* (2013.01); *Y02B 90/18* (2013.01); *Y02T 90/32* (2013.01)

(58) Field of Classification Search
None
See application file for complete search history.

(56) References Cited

U.S. PATENT DOCUMENTS 9,692,060 B2 * 6/2017 Chokai .................. H01M 4/90

OTHER PUBLICATIONS

Nallathambi, 2011, Pressure Pyrolysed Non-Precious Oxygen Reduction Catalysts for Proton Exchange Membrane Fuel Cells.*
Atanassov, active support for cathode catalysts, Apr. 2012.*
(Continued)

*Primary Examiner* — Melvin C. Mayes
*Assistant Examiner* — Stefanie J Cohen
(74) *Attorney, Agent, or Firm* — Gonzales Patent Services; Ellen M. Gonzales

(57) ABSTRACT

Novel active supports, novel catalysts, and methods of preparing active supports using a sacrificial template particles and methods of preparing the same are all described.

20 Claims, 14 Drawing Sheets

(56) References Cited

OTHER PUBLICATIONS

Easton et al, thermally treated Fe—C—N Oxygen Reduction Catalysts prepared by vacuum deposition, ECS Transactions, 3 (1), pp. 241-248 (Year: 2006).*

MInteer, New materials for biological fuel cells, materials today, vol. 15, No. 4, pp. 166-173 (Year: 2012).*

* cited by examiner

SEM image for active support (AS) consisted of
Fe-C-N network

ACTIVE SUPPORT FOR CATHODE CATALYSTS

CROSS-REFERENCE TO RELATED APPLICATIONS

The following application claims benefit of U.S. Application No. 61/763,405, filed Feb. 11, 2014, which is hereby incorporated by reference in its entirety.

BACKGROUND

Fuel cells are receiving increasing attention as a viable energy-alternative. In general, fuel cells convert electrochemical energy into electrical energy in an environmentally clean and efficient manner. Fuel cells are contemplated as potential energy sources for everything from small electronics to cars and homes. In order to meet different energy requirements, there are a number of different types of fuel cells in existence today, each with varying chemistries, requirements, and uses.

As one example, Direct Methanol Fuel Cells (DMFCs) rely upon the oxidation of methanol on an electrocatalyst layer to form carbon dioxide. Water is consumed at the anode and produced at the cathode. Positive ions ($H^+$) are transported across a proton exchange membrane to the cathode where they react with oxygen to produce water. Electrons can then be transported via an external circuit from anode to cathode providing power to external sources.

As another example, polymer electrolyte membrane (PEM) fuel cells (also called proton exchange membrane fuel cells) use pure hydrogen (typically supplied by a hydrogen tank) as a fuel. A stream of hydrogen is delivered to the anode side of a membrane-electrode assembly (MEA), where it is catalytically split into protons and electrons. As with the DMFC, the positive ions are transported across a proton exchange membrane to the cathode where they react with oxygen to produce water.

Currently, one of the limiting factors in the wide scale commercialization of PEM and DMFC fuel cells is the cost associated with precious metals. Both DMFC and PEM fuel cells commonly use platinum as an electrocatalyst. Noble metals such as platinum are needed to catalyze the sluggish oxygen reduction reaction (ORR) at the cathode. One of the major routes to overcome this limitation is to increase the platinum utilization in noble-metal based electrocatalysts. Another viable route is to use a less expensive, yet still sufficiently active catalyst in larger quantities. Several classes of non-platinum electrocatalysts have been identified as having adequate oxygen reduction activity to be considered as potential electrocatalysts in commercial fuel cell applications.

Generally, known non-platinum electrocatalysts are supported on high surface area carbon blacks. This is done to increase dispersion, active surface area, and conductivity of the catalytic layer. The synthesis procedure usually includes precipitation of the precursor molecules onto the supporting substrate and pyrolyzation of the supported precursor.

Metal-Nitrogen-Carbon (M-N—C) catalysts have been found to be very promising for electrochemical oxygen reduction applications in fuel cell membrane electrode assemblies (MEAs), stacks and fuel cell systems. Critical aspects of the materials include the presence of metallic particles, conjugated carbon-nitrogen-oxide-metallic networks, and nitrogen-bonded carbon. The metallic phase includes metallic, oxide, carbide, nitride, and mixtures of these states. The chemical states and bonding of the N/C/M networks and N/C networks influences performance, for example, increased overall nitrogen content improves ORR performance. However, these systems still suffer from several significant drawbacks including: low stability in acidic environments, low durability in acid and alkaline environments, high costs of nitrogen precursors and low activity in ORR compared with platinum. The problem of low stability in acid is connected to leaching of metal from carbon-nitrogen network. Low durability in acid and alkaline solutions is explained by the evolution of significant amount of $H_2O_2$ in these environments which is corrosive for both metal and carbon-nitrogen networks. The low activity is possibly due to the low metal loading, and as a result in low concentration of active sites in such catalysts due to using external carbon source (high surface carbons like Vulcan, KetjenBlack etc.).

SUMMARY

In the present disclosure, novel porous, active supports for catalytic materials formed from non-platinum group metal (PGM) and methods for making the same are described.

According to another embodiments, novel catalysts comprising catalytic materials supported on the above-described active supports and methods for making the same are described.

According to still another embodiments, novel hybrid catalysts comprising platinum-group metal catalysts supported on the above-described active supports and methods for making the same are described.

BRIEF DESCRIPTION OF THE DRAWINGS

FIG. 6 is an SEM image of 2 wt %. Pt supported on AS.

FIG. 10 is an SEM image of 5 wt % Pt supported on an AS.

FIG. 12 is an SEM image of 20 wt % Pt supported on an AS.

FIG. 13 is an SEM image of 20 wt % $Pd_3Co$ supported on an AS.

FIG. 17 is an SEM image of Fe-Aminoantipyrine catalyst supported on an AS.

FIG. 18 is an SEM image of Fe-Cyanamide catalyst supported on an AS.

FIG. 20 is an SEM image of Fe-Urea catalyst supported on an AS.

FIG. 22 is an SEM image of $Ru_{85}Se_{15}$ catalyst supported on an AS.

DETAILED DESCRIPTION

Figure 1:
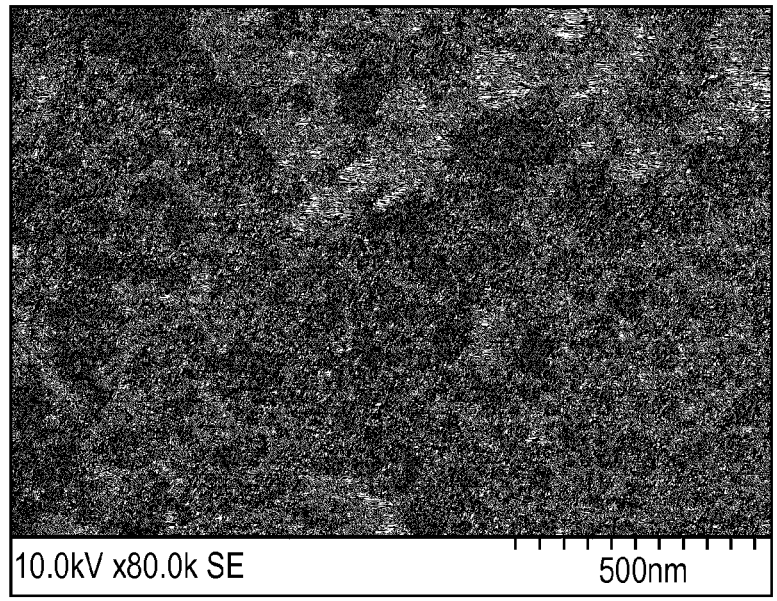
FIG. 1 is an SEM image of an active support (AS) synthesized using urea as a precursor material.

According to an embodiment, the present disclosure provides novel porous active supports and methods for making the same. In contrast to many previously described methods of producing active supports which involve the implantation or deposition of nitrogen species onto the surface of a pre-formed carbon support in order to form active sites, the present disclosure provides a sacrificial support-based method which enables single step synthesis of active supports having a well-defined porous morphology and active sites dispersed throughout the entire structure. Furthermore, because the methods disclosed herein can be used to produce active supports having a well-defined morphology, and in particular, a controllable and well-defined porous morphology, the active supports described herein can be tailored to meet specific needs in terms of size, shape, and activity.

For the sake of clarity, in the present application the term "catalyst" is used to refer to a final product, which catalyzes a desired reaction or reactions, including, for example, the type of electrocatalytic reactions required for use in various types of fuel cells. The catalyst may include multiple types of materials, including, for example, catalytic materials, supporting materials (active or inactive), etc.

For the purposes of the present disclosure, the term "catalytic material" is any material which contains one or more active sites that enable catalysis. Examples of catalytic materials include active supports and platinum group metals. Examples of catalyzed reaction are the electrochemical Oxygen Reduction Reaction (ORR) and Hydrogen Peroxide Reduction Reaction (PRR). For the purpose of the present disclosure, the term "amorphous catalytic material" refers to a material which contains one or more types of active sites, but which must rely on the presence of a support to provide three-dimensional structure. Examples of amorphous catalytic materials include the platinum group metals disclosed herein.

For the purposes of the present disclosure, the term "active site" is used to describe chemical species on the surface of catalyst or/and active support that participate in the catalyzed reaction. It will be understood that different types of active sites may use different types of catalytic pathways. For example, for electrochemical oxygen reduction some active sites follow a 4 electron (4 e) pathway, while other follow a 2 electron (2 e) pathway. Examples of catalysts having active sites that follow the 4 e pathway include Pt, Pd, RuSe, and PdSe. (See e.g., J. Phys. Chem. C 2009, 113, 15422-15432 O₂ Reduction Mechanism on Non-Noble Metal Catalysts for PEM Fuel Cells. Part I: Experimental Rates of O2 Electroreduction, H2O2 Electroreduction, and H₂O₂ Disproportionation Fré dé ric Jaouen and Jean-Pol Dodelet, which is hereby incorporated by reference.) Examples of catalysts having active sites that follow the 2 e pathway include MoSe, nitrogen-doped carbons, and CNTs.

For the purposes of the present disclosure, the terms "support" or "supporting material" is used to describe a physical structure on which a catalytic material is or can be situated, and thus provides the three-dimensional structure and morphology of the catalyst. The physical structure typically provides for the dispersion of the catalyst and provides physical, thermal, and electronic connectivity of the catalytic materials. Furthermore, a support must provide physical, thermal, and electrical connectivity with the outside world (that there the support must enable or provide electrical conductivity with structures, materials, etc. that are neither the support or the catalytic material.) An "active support" is a support that includes or is formed from material that is able to both provide the structural support and electrical connectivity described above, and display an active site which enables and takes part in catalysis.

According to a more specific example, an active support according to the present disclosure may be synthesized utilizing a sacrificial template-based method. For the purposes of the present disclosure, the term "sacrificial template" is intended to refer to a material that is included during the synthesis process in order to provide temporary structure but which is mostly or entirely removed during the synthesis process. According to one embodiment of this particular method, sacrificial template particles are coated, infused, or otherwise mixed with M-N—C precursors under suitable conditions to enable polymerization of the precursors around the sacrificial template particles so as to form a polymer material containing the sacrificial template particles. The polymerized materials containing the template particles are then subjected to heat treatment, such as pyrolysis to form a rigid three-dimensional structure containing metal, nitrogen, carbon, and sacrificial template particles. The sacrificial template particles are then removed, resulting in a porous three-dimensional structural support wherein the pores are the voids that are produced by the removal of the template particles.

For the purposes of the present disclosure, the term "precursor" is used to refer to one or more compounds which participate in a chemical reaction by contributing one or more atoms to a compound that is formed as the product of the chemical reaction or otherwise contributes to the formation of the product. For example in generating a gaseous product that creates a small pore or void in the final product or in helping create the chemical structure of the final product as in the case of nickel nanoparticles leading to the growth of carbon fibers.

It will be appreciated that the present disclosure often makes reference to "M-N—C precursors." It should be understood that such terminology is used to refer to any single or group of precursors which, taken as a whole, contain suitable metal, nitrogen, and carbon atoms which are available for chemical synthesis. Accordingly, an "M-N—C precursor" may refer to a metal-nitrogen-and-carbon-containing precursor; or to a metal-containing precursor and a nitrogen-and-carbon-containing precursor; or a metal-and-nitrogen-containing precursor and a carbon-containing precursor; or a metal-and-carbon-containing precursor and a nitrogen-containing precursor; or a metal-containing precursor, a nitrogen-containing precursor, and carbon-containing precursor, so long as the metal, nitrogen, and carbon, are available for chemical synthesis.

According to an embodiment, the M-N—C precursors of the present disclosure typically include exclusively or inclusively compounds containing nitrogen and carbon and non-platinum group or transition metal precursors (including platinum group metals). Suitable nitrogen and carbon containing compounds include, for example, N-Phenyl-1-naphthylamine, Melamine, 4-Aminoantipyrine, Poly(acrylamide-co-diallyldimethylammonium chloride), Poly(2-ethyl-2-oxazoline) etc. Exemplary characteristics which may be examined with regard to the selection of nitrogen, carbon, or nitrogen-carbon precursors used for producing active supports as described herein include, but are not limited to: (1) carbon richness; (2) nitrogen richness; and (3) thermal stability, i.e. the volatility of the molecules and resistance to decomposition due to heating. The degree of carbon richness is related to the porosity of the final product. For example, according to some embodiments, a porous, open-frame matrix will be formed if each molecule of the carbon precursor contains, on average, at least 5 carbon atoms. Depending on whether the plan is to perform synthesis in an inert or nitrogen-rich environment, the nitrogen richness of the precursor may need to be taken into account. For example, if synthesis is to be performed in an inert atmosphere, the precursor must have a substantial amount of nitrogen, since all the M-NX centers must be formed from nitrogen contained in the precursor itself. Finally, precursors should be chosen which will remain stable under the thermal conditions to be used. For example, if the methodology to be used requires pyrolysis at a temperature of above 700° C. (a minimum temperature frequently required for active-site formation), it is important that the precursor remain stable at temperatures above 700° C.

Suitable transition metals include Fe, Ce, Cr, Cu, Mo, Ni, Ru, Ta, Ti, V, W, Mn, and Zr. (It will be noted that while many of the examples herein refer to the use of iron as the transition metal, other transition metals, including those identified above, can be substituted to various levels in place of iron, by simply using precursors of those metals instead. Example transition metal precursors include, but are not limited to iron nitrate, iron sulfate, iron acetate, iron chloride, cerium nitrate, chromium nitrate, copper nitrate, ammonium molybdate, nickel nitrate, ruthenium chloride, tantalum isopropoxide, titanium ethoxide, vanadium sulfate, ammonium tungstate and zirconium nitrate. Furthermore, according to some embodiments the presently described methodologies may utilize precursors of two or more metals to produce multi-metallic supports.

It will be appreciated that the sacrificial support may be synthesized and mixed (or coated, or infused, etc.) in a single synthesis step or the sacrificial template may be synthesized first (or otherwise obtained) and then mixed with the M-N—C precursors. The M-N—C precursor/sacrificial template mixture is then subjected to heat treatment, (such as pyrolysis) in an inert ($N_2$, Ar, He, etc.) or reactive ($H_2$, $NH_3$, acetonitrile, etc.) atmosphere.

Of course it will be appreciated that given the high temperatures that the sacrificial template will be subjected to during the synthesis method, it is important to select a template material which is non-reactive to the catalytic materials under the specific synthesis conditions used and the removal of which will not damage the support's active sites. Silica is a material which is known to easily withstand the conditions described herein while remaining inert to the catalytic materials described and which can be removed using techniques that are harmless to the support's active sites. Thus, silica is considered to be a suitable material from which the sacrificial template particles can be made. However, while many of the examples herein utilize silica for the templating materials, it will be appreciated that other suitable materials may be used including, but are not limited to, zeolites, aluminas, and the like. According to various embodiments, the template particles may take the form of any two- or three-dimensional regular, irregular, or amorphous shapes, including, but not limited to, spheres, cubes, cylinders, cones, etc. The particles may be monodisperse, or irregularly sized. Furthermore, the particles may or may not be porous and any pores may be of the same or different sizes and shapes.

It will be appreciated that the size and shape of the template particles may be selected according to the desired shape(s) and size(s) of the voids within the final catalyst product. Specifically, it will be understood that by selecting the particular size and shape of the template particles, one can produce an electrocatalyst having voids of a predictable size and shape. For example, if the template particles are spheres, the electrocatalyst will contain a plurality of spherical voids having the same general size as the spherical template particles. For example, in an embodiment where silica particles having an average diameter of 20 nm is used, the spherical voids in the electrocatalyst will typically have an average diameter of approximately 20 nm (Those of skill in the art will understand that if the diameter of the particle is 20 nm, the internal diameter of the void in which the particle resided will likely be just slightly larger than 20 nm and thus the term "approximately" is used to account for this slight adjustment.)

As stated above, according to some embodiments, sacrificial particles of any diameter may be used. In some preferred embodiments, sacrificial particles having a characteristic length of between 1 nm and 100 nm may be used, in more preferred embodiments, silica particles having characteristic lengths of between 100 nm and 1000 nm may be used and in other preferred embodiments, silica particles having characteristic lengths of between 1 mm and 10 mm may be used.

According to some specific embodiments, 20 nm diameter spheres formed from mesoporous silica can also be used in the templating synthesis approach. In this case the templating involves intercalating the mesopores of the silica template material and results in a self-supported electrocatalysts with porosity in the 2-20 nm range. In one particular embodiment, the silica template is Cabosil amorphous fumed silica (325 $m^2/g$). Those of skill in the art will be familiar with a variety of silica particles that are commercially available, and such particles may be used. Alternatively, known methods of forming silica particles may be employed in order to obtain particles of the desired shape and/or size.

As stated above, after polymerization of the M-N—C materials around the sacrificial support, the resulting material is heat treated either in an inert atmosphere such as $N_2$, Ar, or He, or in a reactive atmosphere such as $H_2$, $NH_3$, or acetonitrile. Inert atmospheres are typically used when the M-N—C materials are nitrogen rich, as the inert atmosphere enables the production of a high number of active sites with Fe (or other metal) $N_4$ centers. However, it may be desired to use a nitrogen rich atmosphere if the M-N—C material is rich in carbon and depleted in nitrogen, as the nitrogen rich atmosphere will enable production of the Fe (or other metal) $N_4$ centers.

According to some embodiments, optimal temperatures for heat treatment are typically between 500° C. and 1100° C. According to some embodiments, heat treatment may preferably be between 750° C. and 900° C., or more preferably between 775° C. and 825° C. In some embodiments, heat treatment of around 800° C. is preferred, as our experimental data showed this temperature to produce catalysts having a high amount of catalytic activity for certain specific materials (see experimental section below). It should be noted that the combination of temperature and duration of the heat treatment can be important and thus, in some embodiments, a heat treatment of between 775° C. and 825° C. for 1 hour may be desirable, with additional 15 minutes at 800° C. being equivalent to 825° C.

After heat treatment, the sacrificial template particles are removed resulting in a porous, active support. In some cases the porous, active support consists only of materials derived from the initial M-N—C precursor materials. Removal of the sacrificial template particles may be achieved using any suitable means. For example, the template particles may be removed via chemical etching. Examples of suitable etchants include NaOH, KOH, and HF. According to some embodiments, it may be preferable to use KOH, as it preserves all metal and metal oxide in the material and, use of KOH may, in fact, increase catalytic activity of the active centers. Alternatively, in some embodiments, HF may be preferred as it is very aggressive and can be used to remove some poisonous species from the surface of the support. Accordingly, those of skill in the art will be able to select the desired etchants based on the particular requirements of the supporting material being formed.

The presently described active supports can also be synthesized using a double heat treatment procedure. In this procedure, the M-N—C precursors are mixed with the sacrificial template, and then subjected to a first heat treatment step, such as pyrolysis, in order to produce an intermediate material that is rich with unreacted iron. The intermediate material is then subjected to a second heat treatment step, which may be, for example, a second pyrolysis treatment, resulting in newly formed active sites. After the second heat treatment, the sacrificial template is removed using chemical etching or other suitable means as described above.

In embodiments utilizing a two-step procedure, and therefore, two separate heat treatment steps, it may desirable for the different heat treatment steps to be conducted under different conditions, for example at different temperatures and/or for different durations of time. For example, the first heat treatment step may be performed at a higher temperature, such as 800° C. for 1 hour and the second heat treatment step may be performed at a temperature between 800 and 1000° C. for a period of time between 10 minutes and 1 hour.

It will be appreciated that some in some applications it may be desirable to produce a multi-metallic active support, for example, in order to produce an active support containing more than one type of active site or to increase the number of active sites while controlling costs, materials availability, or other factors. Accordingly, as indicated above, according to some embodiments, the presently described method may incorporate the use of precursors of multiple metals in order to achieve a desired activity, stability, cost-effectiveness or other factor.

According to some embodiments, it may be desirable to produce large numbers of active supports as described herein. High production yield may be produced, for example, by implementing a batch-wise process. Accordingly, the present disclosure further provides a method for large-scale preparation of the presently described active supports. According to an embodiment, the present disclosure provides a method which combines a sacrificial template-based methodology with spray pyrolysis to produce active catalyst supports. According to this method, the spray pyrolysis method is a continuous method while the sacrificial template-based methodology is performed batch-wise. According to an exemplary method, the M-N—C precursor materials described herein are mixed with sacrificial template particles, the mixture is atomized, and the resulting droplets dried in a tube furnace. The powder obtained from this procedure is then collected on a filter. The collected powder is then heat treated. Finally, the template material is removed, for example by leaching with HF or KOH.

According to another embodiment, the present disclosure provides a method for forming active supports utilizing a mechanosynthesis based approach. The herein described mechanosynthesis-based approach enables, for example, the preparation of a variety of materials including, but not limited to, active supports formed from or including insoluble materials. Of course it will be appreciated that while the method does not require the addition of solvents, solvents may be used, if desired. The method employs ball-milling the M-N—C precursors and sacrificial template materials together under sufficient conditions that the energy produced by the ball-mill drives polymerization of the precursors materials.

Ball-milling has been described previously in referenced to M-N—C catalyst material synthesis as a method for filling the pores of a carbon support with a pore-filler. See e.g., Jaouen et al. [44]. However, in the methods described in the present disclosure, ball-milling is used to enable mechanosynthesis, alleviating the need for solvent-based preparation methods. For the purposes of the present disclosure, the term "ball mill" is used to refer to any type of grinder or mill that uses a grinding media such as silica abrasive or edged parts such as burrs to grind materials into fine powders and/or introduce to the system enough energy to start a solid state chemical reaction that leads to the formation of a catalyst. In general, for the purposes of the present disclosure, the ball mill used should be capable of producing enough energy to initiate the desired chemical reaction or achieve the desired level of mixing.

According to a more specific example, a catalytic material according to the present disclosure may be synthesized by ball milling the M-N—C precursors under sufficient conditions to initiate polymerization of the various precursors, thereby forming (or initiating formation of) an M-N—C polymer around and/or throughout the sacrificial template particles. The M-N—C polymer/template particle complex is then subjected to heat treatment, (such as pyrolysis) in an inert (N$_2$, Ar, He, etc.) or reactive (H$_2$, NH$_3$, acetonitrile, etc.) atmosphere at a sufficient temperature to produce active sites within the polymerized material. As with the example, above, the sacrificial template particles are then removed, using, for example, the techniques described above.

As stated above, according to some embodiments, the entire process is performed dry, by which is meant, without the presence of any added solvents. According to one embodiment of a solvent-free process, all reactants (i.e. precursors) are combined in a ball mill in powder form and the entire process is conducted without the addition of any liquids. For the purposes of the present disclosure, a powder is a dry, bulk solid composed of a large number of very fine particles that may flow freely when shaken or tilted. Because the method can be practiced without the presence of any solvents, the method enables the synthesis of active supports formed from insoluble materials. Examples of insoluble materials which can be used to form active supports according to the present disclosure include, but are not limited to Poly(4-vinylpyridine), Poly(pyromellitic dianhydride-co-4, 4'-oxydianiline), etc.

According to some embodiments, the present disclosure provides active supports decorated with catalytic materials such as, but not necessarily limited to, Pt, Pt alloys, PdM, platinum group metals, transition metals and their carbides, nitrides, oxides and chalcogenides, RuCh, MCh (where M is a transition metal and Ch is S, Se, and/or Te) and/or biocatalysts such as biocatalytic enzymes, and/or microbial organisms. These catalytic materials can be decorated, deposited or otherwise attached to the support by various means suitable to the type of catalytic material selected and the materials used to form the active support. For example, platinum and platinum group metals may be attached to the support by vapor deposition, chemical and thermal reduction methods, atomic layer deposition, sputtering, etc. Biocatalysts can be deposited by soft chemisorption or by physisorption from solutions.

For the purposes of ease of discussion, those catalytic materials which have been attached to the fully-formed support may be referred to herein as "primary catalytic materials" containing (or presenting) "primary active sites" while the supporting material described above may be referred to as a "secondary catalytic material" containing (or presenting) "secondary active sites." It should be understood, however, the terms primary and secondary are used solely for the purposes of distinction and are not intended to acknowledge or imply any relationship between the two types of materials or sites including the activity, or abundance of such materials or sites.

Accordingly, it will be appreciated that the catalyst construct described herein may also be thought of as hybrid catalyst containing both primary and secondary catalytic materials and thus primary and secondary active sites. In this capacity it should be understood that, depending on the types of catalytic materials selected to be able to work in concert with one another to produce a catalyst having catalytic activity that is significantly higher than is produced by a catalyst formed from either catalytic material alone. Moreover, as demonstrated in the examples section below, we have been able to produce hybrid catalysts have catalytic activity that is higher than the combined activity of individual catalysts formed from the different component catalytic materials. This synergetic effect enables the production of highly effective and efficient catalysts using percentages of expensive platinum and platinum group metals that were previously considered too small for catalysis. For example, while previously described catalysts have required 40-60% platinum in order to carry out effective catalysis, we've been able to achieve the same levels of catalysis with catalysts formed with as little as 5% platinum. Accordingly, the presently described methods and materials enable effective catalysis by catalysts having less than 40% platinum, less than 30% platinum, less than 20% platinum, and less than 10% platinum. Similarly, we've been able to produce effective catalysts containing between 10 and 20% palladium and 30% ruthenium, both of which are substantially less than previously described catalysts.

Accordingly, according to some embodiments, the co-catalytic materials may be selected so that one follows the two electron catalytic pathway and the other follows the four electron catalytic pathway. Alternatively active support can be used in case of catalysts for electrooxidation of different fuels (PGMs, transition metals), as a material for supporting of catalyst for CO$_2$ electroreduction etc.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. The methods and processes illustratively described herein suitably may be practiced in differing orders of steps, and that they are not necessarily restricted to the orders of steps indicated herein or in the claims. As used herein and in the appended claims, the singular forms "a," "an," and "the" include plural reference unless the context clearly dictates otherwise. Thus, for example, a reference to "a catalyst" includes a plurality of such catalysts, and so forth.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

All patents and publications referenced below and/or mentioned herein are indicative of the levels of skill of those skilled in the art to which the invention pertains, and each such referenced patent or publication is hereby incorporated by reference to the same extent as if it had been incorporated by reference in its entirety individually or set forth herein in its entirety. Applicants reserve the right to physically incorporate into this specification any and all materials and information from any such cited patents or publications.

Additional information may be gathered from the Examples section below. The reaction tests shown and described in the drawings and in the following examples clearly demonstrate that catalysts prepared using the method described possess high Oxygen Reduction activity in acid media. Further, the mechanism of oxygen reduction shows the direct reduction of oxygen to water by a 4 electron pathway, preventing corrosive peroxide production and therefore improving stability and durability of catalysts. Thus, catalysts of the composition and using the preparation method described herein, including but not limited to the described materials shown herein, are effective catalysts for oxygen reduction.

EXAMPLES

I. Synthesis of an Active Support (AS)

Figure 2:
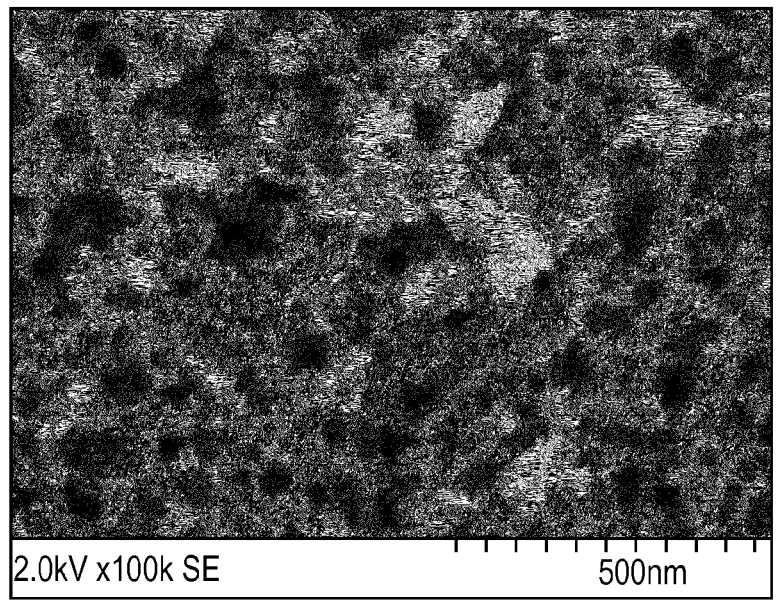
FIG. 2 is an SEM image of an AS synthesized using bipyridine as a precursor material.
Figure 3:
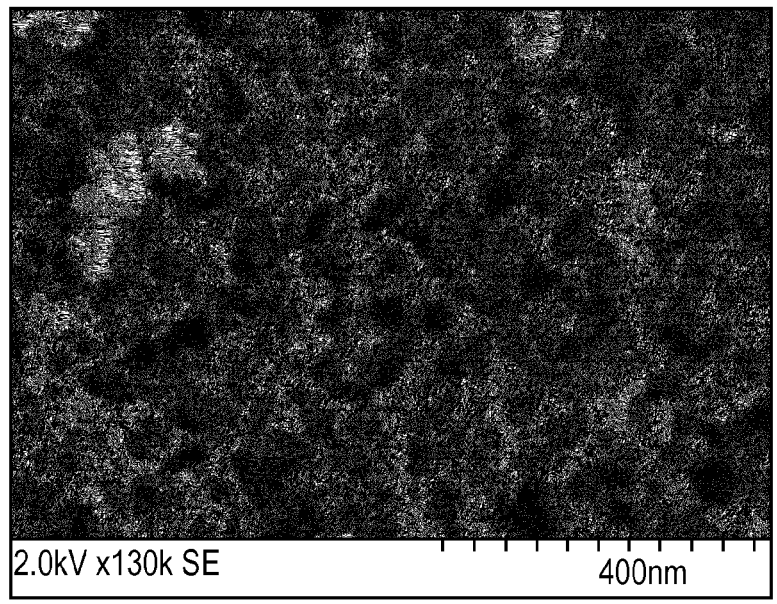
FIG. 3 is an SEM image of an AS synthesized using cyanamide as a precursor material.
Figure 4:
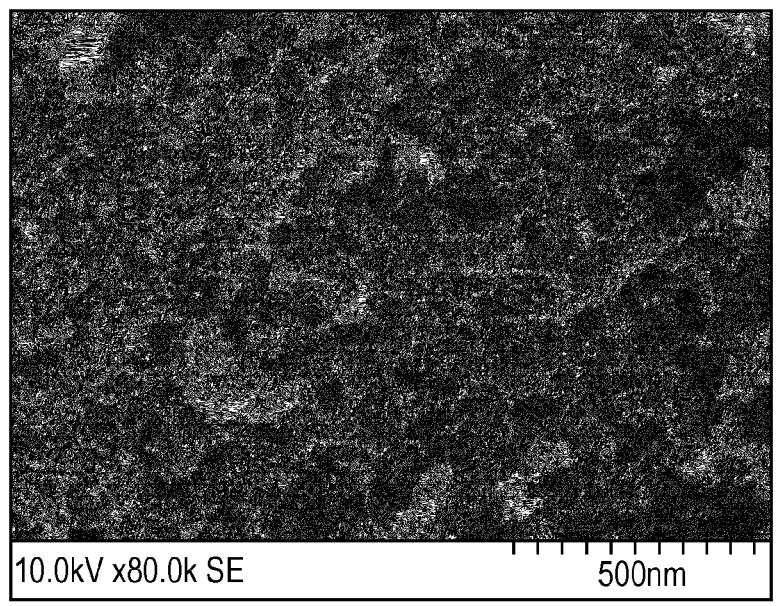
FIG. 4 is an SEM image of an AS synthesized using polydiallyl as a precursor material.

An active support was synthesized by sacrificial template method. 2 g of silica were dispersed in 20 ml of DI water and 3 g of Fe($NO_3$)$_3$ and 5 g polyethylenimine were added to the solution. Mixture was dried on ultrasound bath and ground with mortar and pestle. Fine powder was heat treated in $N_2$ atmosphere at T=950 C for 1 h. Silica was leached by 42 wt % of HF and powder was washed with DI water until neutral pH. FIG. 1 is an SEM image for an active support (AS) formed using urea as the precursor material. FIG. 2 is an SEM image of an AS formed using bipyridine as the precursor material. FIG. 3 is an SEM image of an AS formed using cyanamide as the precursor material. FIG. 4 is an SEM image of an AS formed using polydiallyl as the precursor material. The surface area of the AS formed using Fe($No_3$)$_3$ and Aminoantipyrine (AAPyr) precursors is shown in Table 1.

II. Synthesis of an Active Support with Fe—C—N Catalyst (Fe—C—N/AS)

Figure 5:
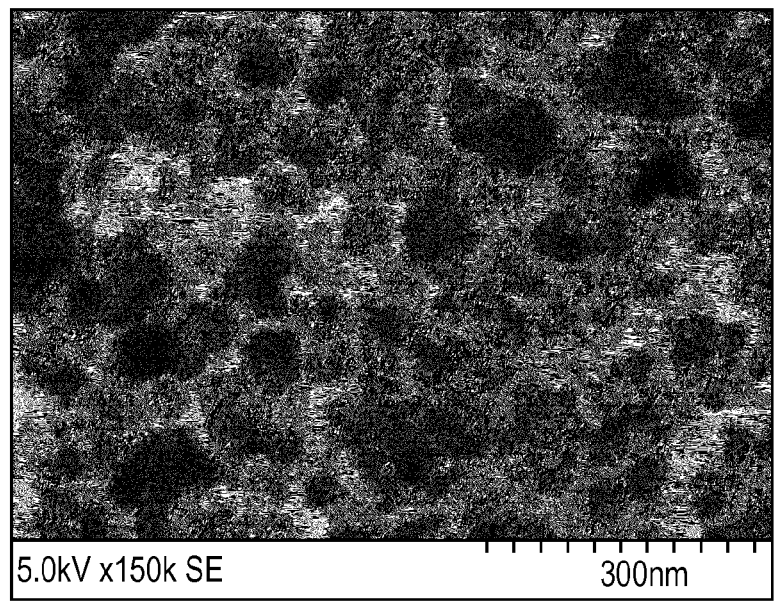
FIG. 5 is an SEM image of an active support (AS) consisting of an Fe—C—N network.

An active support Fe—C—N catalyst was synthesized by mechanochemical synthesis. 5 g of silica were mixed with 13 g of Fe($NO_3$)$_3$ and 45 g phenanthroline and ball-milled at 600 RPT for 24 hours. The fine powder was heat treated in $N_2$ atmosphere at T=950 C for 1 h. Silica was leeched by 42 wt % of HF and powder was washed with DI water until neutral pH. FIG. 5 is an SEM image of an active support with a Fe—C—N network.

III. Synthesis of an Active Support with Pt Catalyst (Pt/AS)

Figure 6:
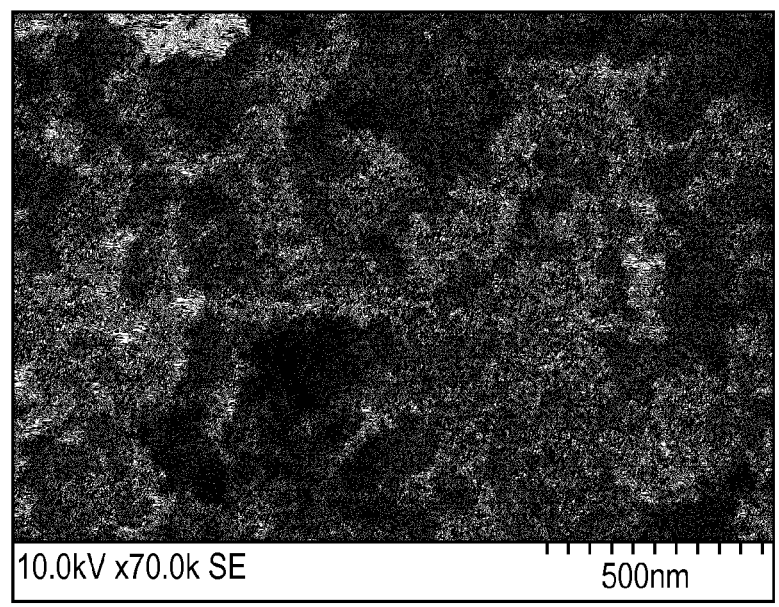
Figure 7:
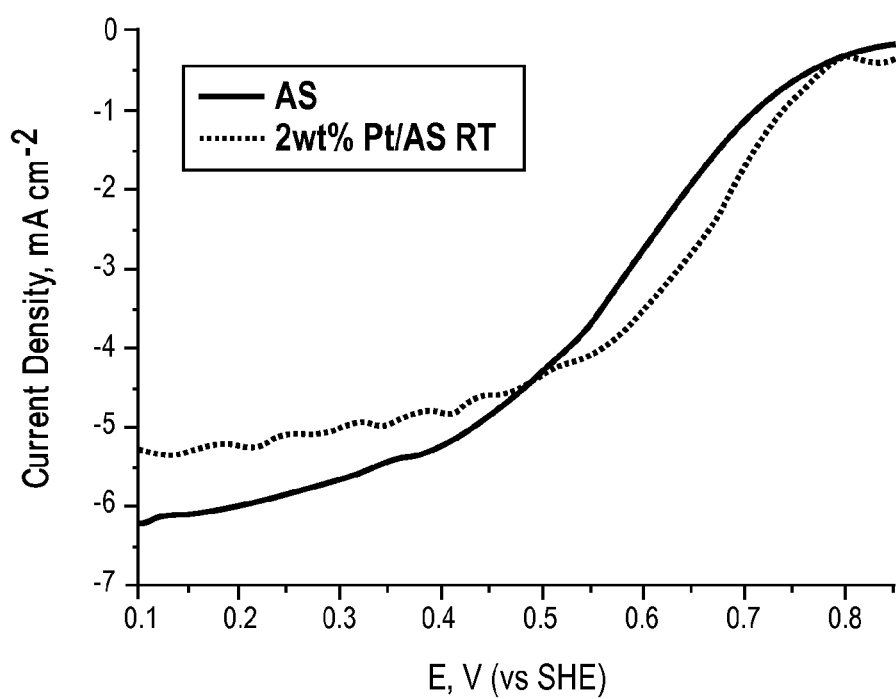
FIG. 7 is RDE data for 2 wt % Pt/AS (reduced by $NaBH_4$) compared to AS only 0.5M $H_2SO_4$ saturated with $O_2$ (catalysts loading: 600 mg $cm^{-2}$, 1600 RPM, 10 mV s-1).
Figure 8:
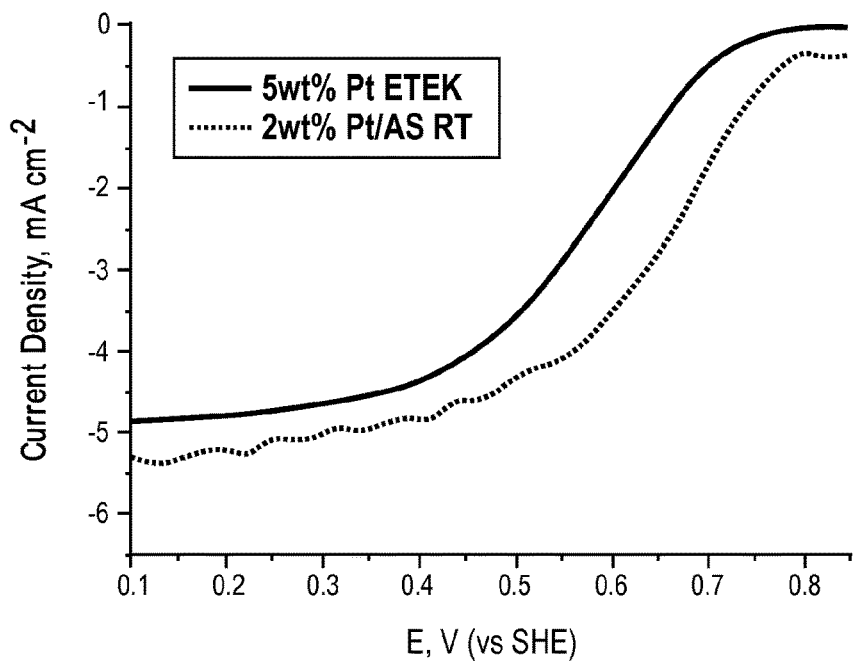
FIG. 8 is RDE data for commercial 5 wt % Pt (ETEK) and 2 wt % Pt/AS (reduced by $NaBH_4$) in 0.5 M $H_2SO_4$ saturated with $O_2$ (catalysts loading: 600 mg $cm^{-2}$, 600 mg $cm^2$, 1600 RPM, 10 mV $s^{-1}$).
Figure 9:
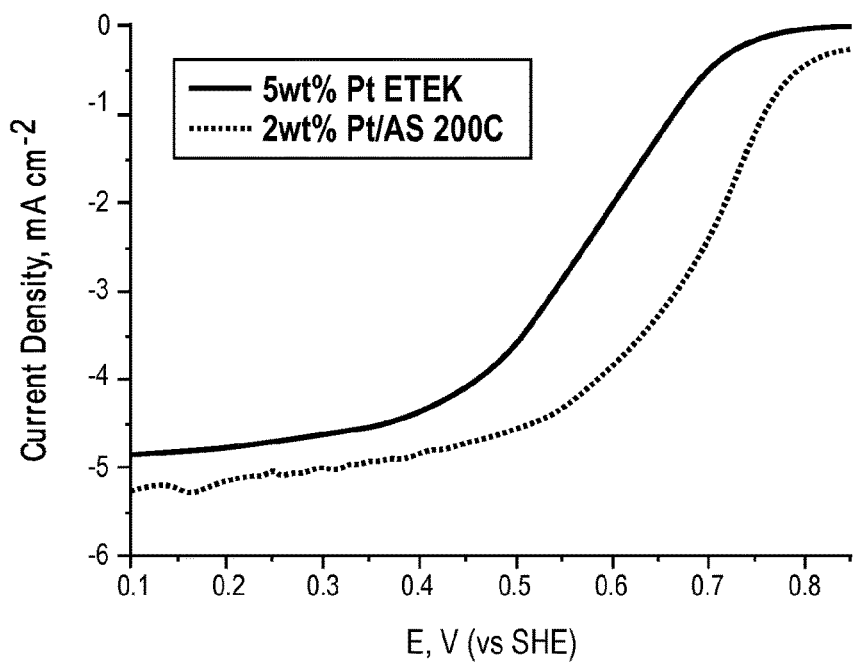
FIG. 9 is RDE data for commercial 5 wt % Pt (ETEK) and 2 wt % Pt/AS (thermally reduced in $H_2$ at 200° C.) in 0.5 M $H_2SO_4$ saturated with $O_2$ (catalysts loading: 600 mg $cm^{-2}$, 600 mg $cm^{-2}$, 1600 RPM, 10 mV $s^{-1}$).
Figure 10:
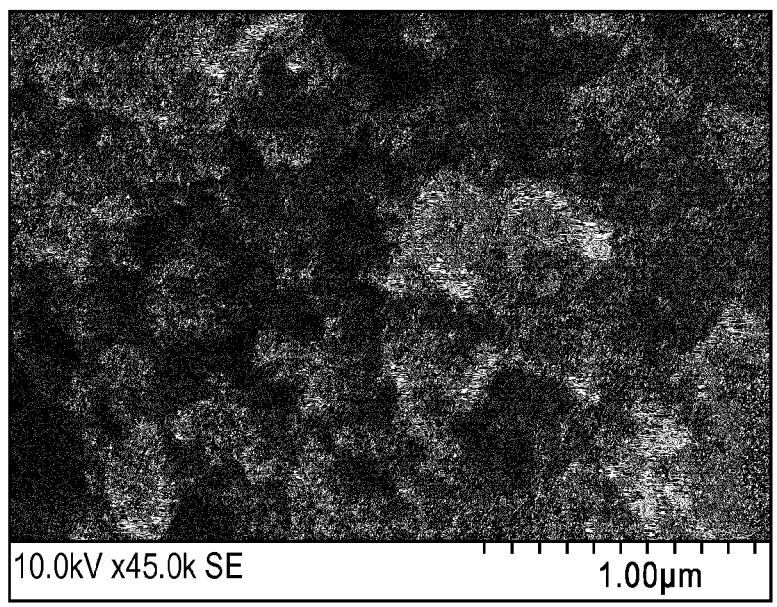
Figure 11:
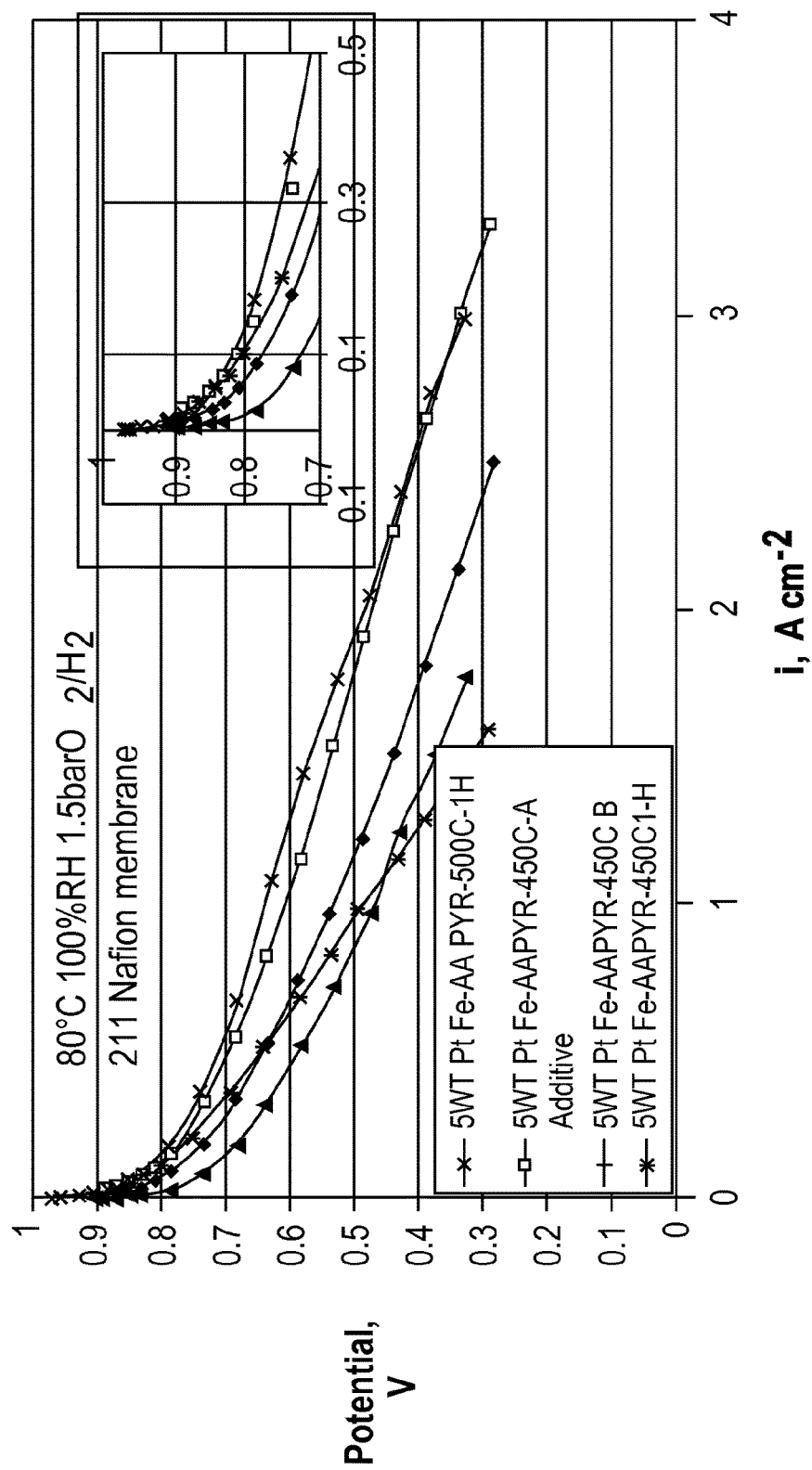
FIG. 11 shows MEA test VIR results of 5 wt % Pt deposited on an active support.
Figure 12:
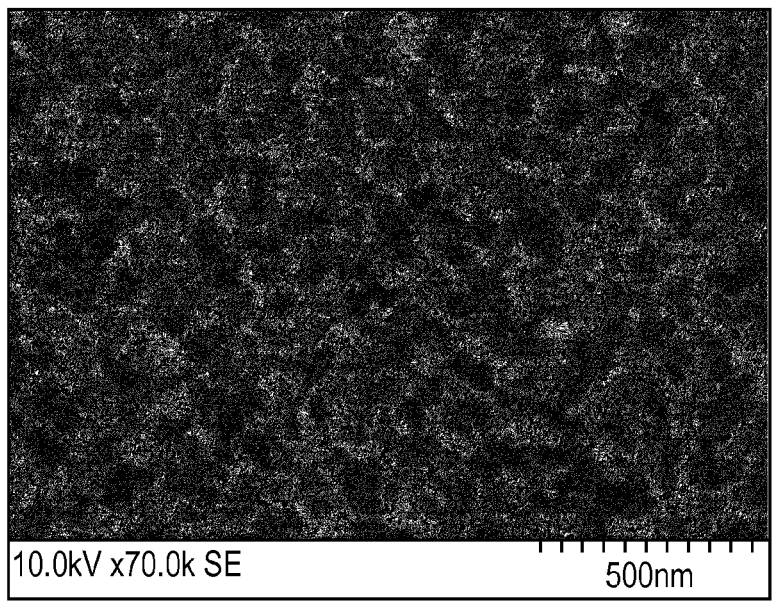

An active support with Pt catalyst was synthesized by following method. Active support from example II was impregnated (dry method) with calculated amount of $H_2PtCl_6$ precursor. Obtained composite material was heat treated in $H_2$ atmosphere at T=200 C for 1 h. FIG. 6 is an SEM image of 2 wt % Pt supported on an AS. FIG. 7 shows RDE data for 2 wt % Pt/AS (reduced by $NaBH_4$) compared to AS only 0.5M $H_2SO_4$ saturated with $O_2$ (catalysts loading: 600 mg cm$^{-2}$, 1600 RPM, 10 mV s-1). FIG. 8 shows RDE data for commercial 5 wt % Pt (ETEK) and 2 wt % Pt/AS (reduced by $NaBH_4$) in 0.5 M $H_2SO_4$ saturated with $O_2$ (catalysts loading: 600 mg cm$^{-2}$, 600 mg cm$^{-2}$, 1600 RPM, 10 mV s$^{-1}$). FIG. 9 shows RDE data for commercial 5 wt % Pt (ETEK) and 2 wt % Pt/AS (thermally reduced in $H_2$ at 200° C.) in 0.5 M $H_2SO_4$ saturated with $O_2$ (catalysts loading: 600 mg cm$^{-2}$, 600 mg cm$^{-2}$, 1600 RPM, 10 mV s$^{-1}$). FIG. 10 is an SEM image of 5 wt % Pt supported on an AS. FIG. 11 shows MEA test VIR results of 5 wt % Pt deposited on active support. FIG. 12 is an SEM image of 20 wt % Pt supported on an AS. Table 1 shows the surface area of various Pt/AS catalysts.

IV. Synthesis of an Active Support with $Pd_3Co$ ($Pd_3Co$/AS)

Figure 13:
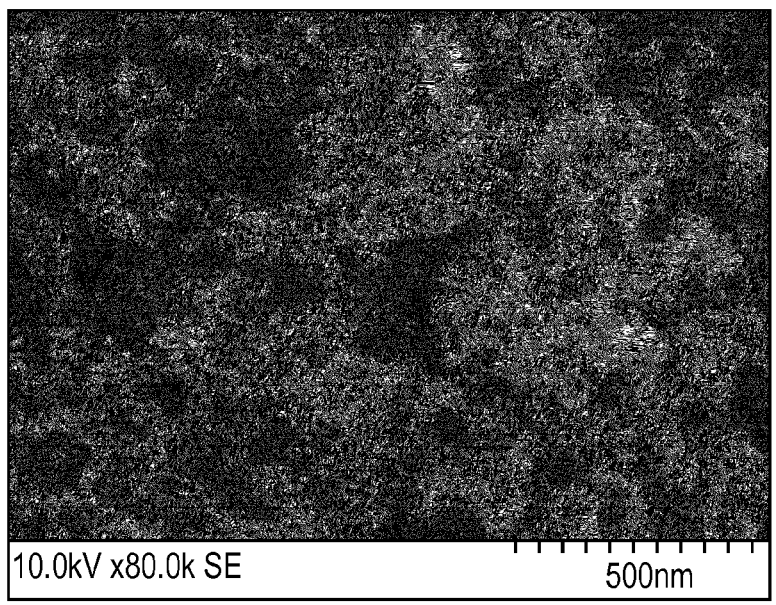
Figure 14:
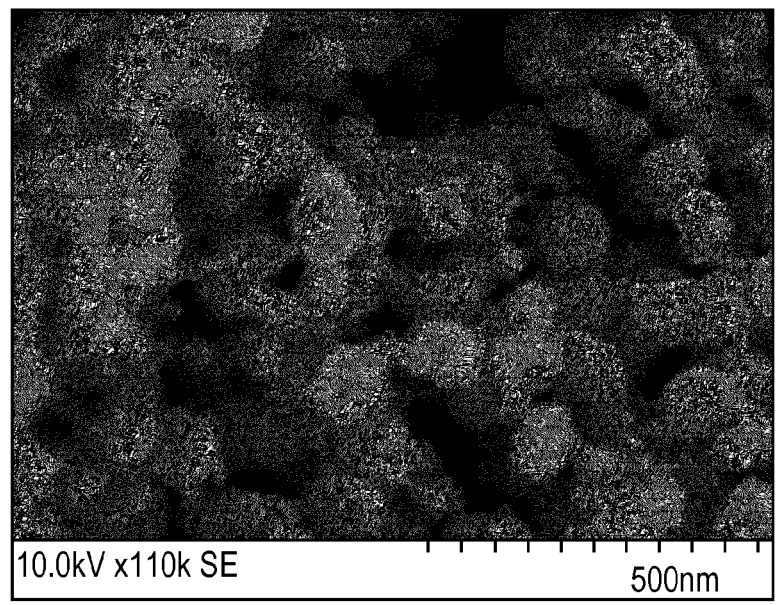
FIG. 14 is an SEM image of 20 wt % $Pd_3Co$ supported on Vulcan XC72R.
Figure 15:
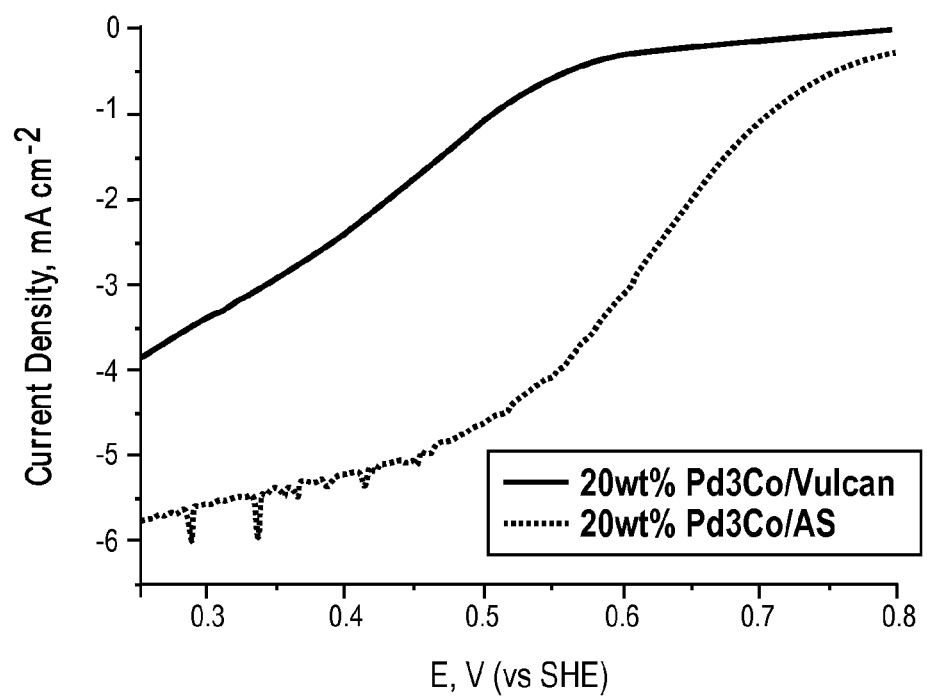
FIG. 15 shows RDE data for 20 wt % Pd₃Co/Vulcan and 20 wt % Pd₃Co/AS in 0.5 M H₂SO₄ saturated with O₂ (catalysts loading: 600 mg cm⁻², 600 mg cm⁻², 1600 RPM, 10 mV s⁻¹).

An active support with $Pd_3Co$ was synthesized by following method. Active support from Example I was impregnated with palladium and cobalt nitrate solution (wet impregnation). Solvent was evaporated at T=85 C and powder was heat treated at $H_2$ atmosphere at T=350 C for 3 h. FIG. 13 is an SEM image of 20 wt % $Pd_3Co$ supported on an AS. FIG. 14 is an SEM image of 20 wt % $Pd_3Co$ supported on Vulcan XC72R. FIG. 15 shows RDE data for 20 wt % $Pd_3Co$/Vulcan and 20 wt % $Pd_3Co$/AS in 0.5 M $H_2SO_4$ saturated with $O_2$ (catalysts loading: 600 mg cm$^{-2}$, 600 mg cm$^{-2}$, 1600 RPM, 10 mV s$^{-1}$). Table 1 shows the surface area of both the $Pd_3Co$/AS and $Pd_3Co$/Vulcan catalysts.

V. Synthesis of an Active Support with Fe-Phenanthroline Catalyst (Fe-Phenanthroline/AS)

Figure 16:
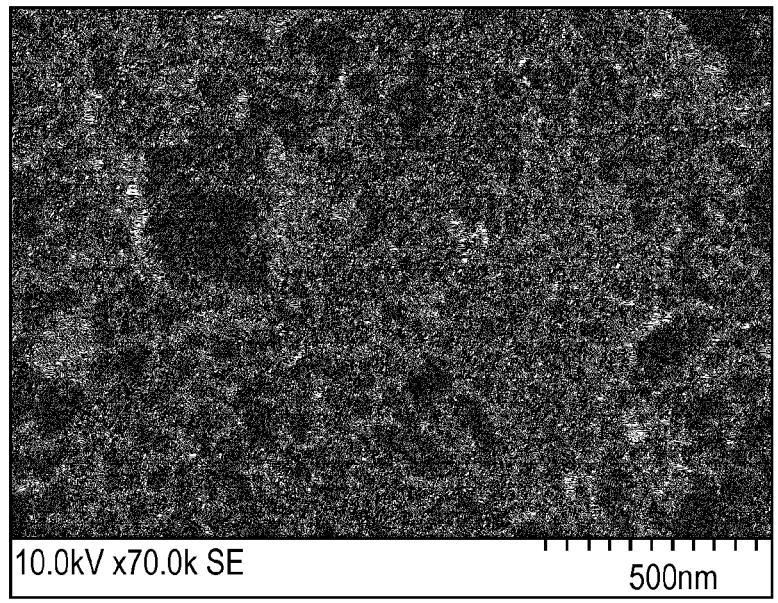
FIG. 16 is an SEM image of Fe-Phenanthroline catalyst supported on an AS. Table 1 shows the surface area of the Fe-Phenanthroline/AS catalyst.

An active support with Fe-Phenanthroline was synthesized by sacrificial template method. Iron nitrate and Phenanthroline in ratio 1:25 (mass) were dissolved in acetone. 13.6 g of colloidal solution of silica were added to the mixture of precursors. Acetone was evaporated and powder was ground. The fine powder was heat treated in Ar atmosphere at T=875 C for 3 h. Silica was removed by 21 wt % HF and powder was washed until neutral pH. FIG. 16 is an SEM image of Fe-Phenanthroline catalyst supported on an AS. Table 1 shows the surface area of the Fe-Phenanthroline/AS catalyst.

VI. Synthesis of Fe-Aminoantipyrine Catalyst (Fe-AAPyr/AS)

Figure 17:
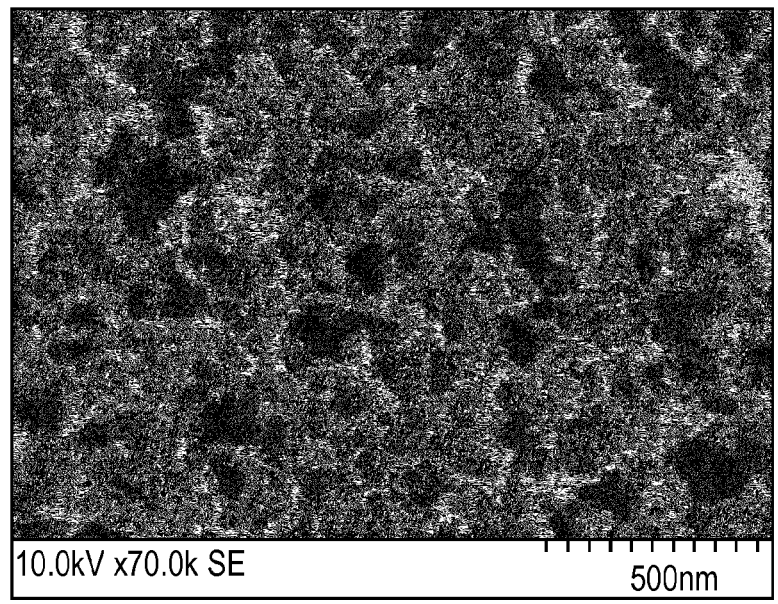

An active support with Fe-Aminoantipyrine was synthesized by following method. Iron nitrate and Aminoantipyrine in ratio 1:12 (mass) were dissolved in DI water. 6.7 g of colloidal solution of silica were added to the mixture of precursors. Water was evaporated and powder was ground. The fine powder was heat treated in Ar+$H_2$ atmosphere at T=925 C for 1 h. Silica was removed by 33 wt % HF and powder was washed until neutral pH. FIG. 17 is an SEM image of Fe-Aminoantipyrine catalyst supported on an AS. Table 1 shows the surface area of the Fe-AAPyr/AS catalyst.

VII. Synthesis of Fe-Cyanamide Catalyst (Fe-Cyanamide/AS)

Figure 18:
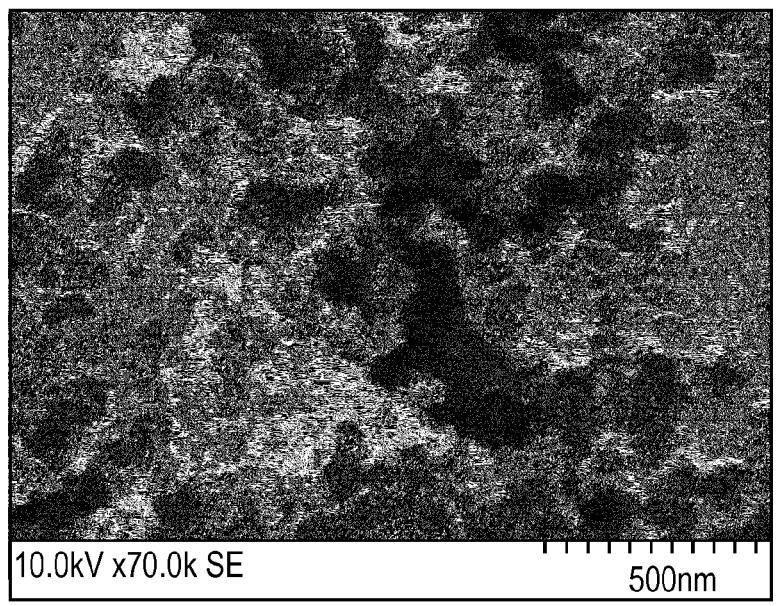
Figure 19:
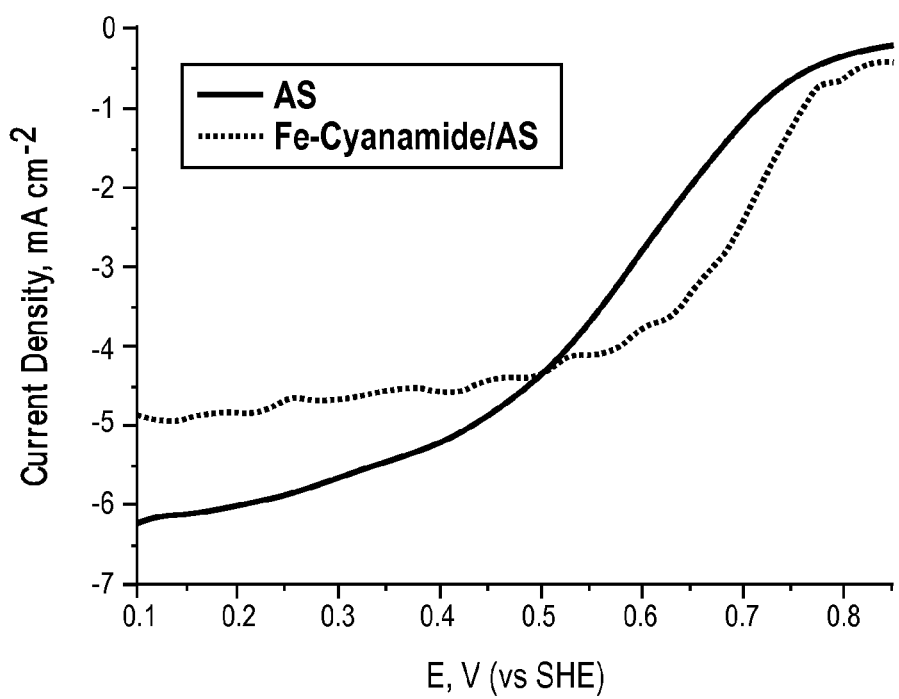
FIG. 19 shows RDE data for AS alone and Fe-Cyanamide/AS in 0.5 M H₂SO₄ saturated with O₂ (catalysts loading: 600 mg cm⁻², 600 mg cm⁻², 1600 RPM, 10 mV s⁻¹).

An active support with Fe-Cyanamide was synthesized by following method. Iron chloride and Cyanamide in ratio 1:6 (mass) were dissolved in EtOH water. 16.4 g of colloidal solution of silica were added to the mixture of precursors. Ethanol was evaporated and powder was ground. The fine powder was heat treated in $N_2$+$H_2$ atmosphere at T=975 C for 30 m. Silica was removed by 33 wt % HF and powder was washed until neutral pH. FIG. 18 is an SEM image of Fe-Cyanamide catalyst supported on an AS. FIG. 19 shows RDE data for AS alone and Fe-Cyanamide/AS in 0.5 M $H_2SO_4$ saturated with $O_2$ (catalysts loading: 600 mg cm', 600 mg cm$^{-2}$, 1600 RPM, 10 mV s$^{-1}$).

VIII. Synthesis of Fe-Urea Catalyst (Fe-Urea/AS)

Figure 20:
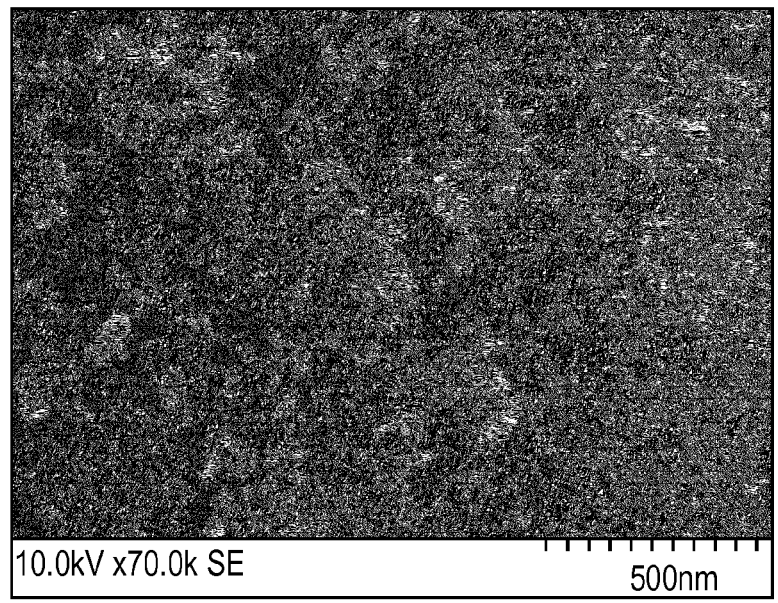
Figure 21:
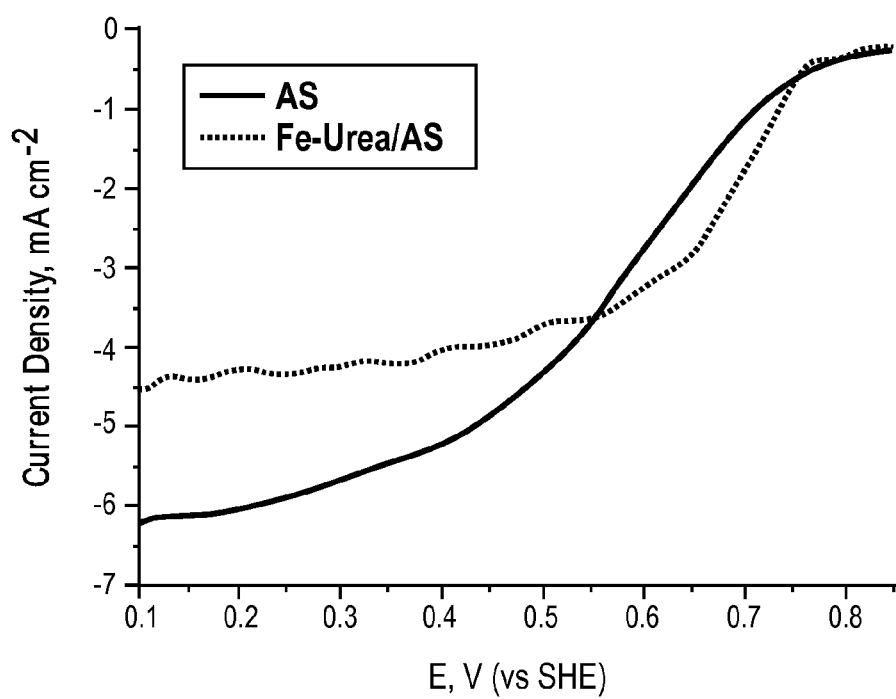
FIG. 21 shows RDE data for AS alone and Fe-Urea/AS in 0.5 M H₂SO₄ saturated with O₂ (catalysts loading: 600 mg cm⁻², 600 mg cm⁻², 1600 RPM, 10 mV s⁻¹).

An active support with Fe-Urea was synthesized by following method. Iron nitrate and Urea in ratio 1:2 (mass) were dissolved in DI water. 2.7 g of colloidal solution of silica were added to the mixture of precursors. Water was evaporated and powder was ground. The fine powder was heat treated in $H_2$ atmosphere at T=925 C for 2 h. Silica was removed by 33 wt % HF and powder was washed until neutral pH. FIG. 20 is an SEM image of Fe-Urea catalyst supported on an AS. FIG. 20 shows RDE data for AS alone and Fe-Urea/AS in 0.5 M $H_2SO_4$ saturated with $O_2$ (catalysts loading: 600 mg cm$^{-2}$, 600 mg cm$^{-2}$, 1600 RPM, 10 mV s$^{-1}$).

VII. Synthesis of $Ru_{85}Se_{15}$ Catalyst ($Ru_{85}Se_{15}$/AS)

Figure 22:
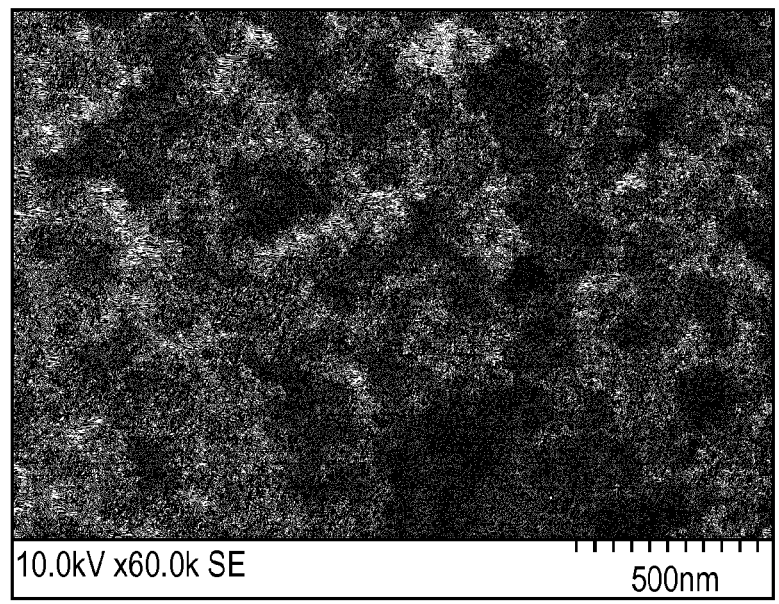
Figure 23:
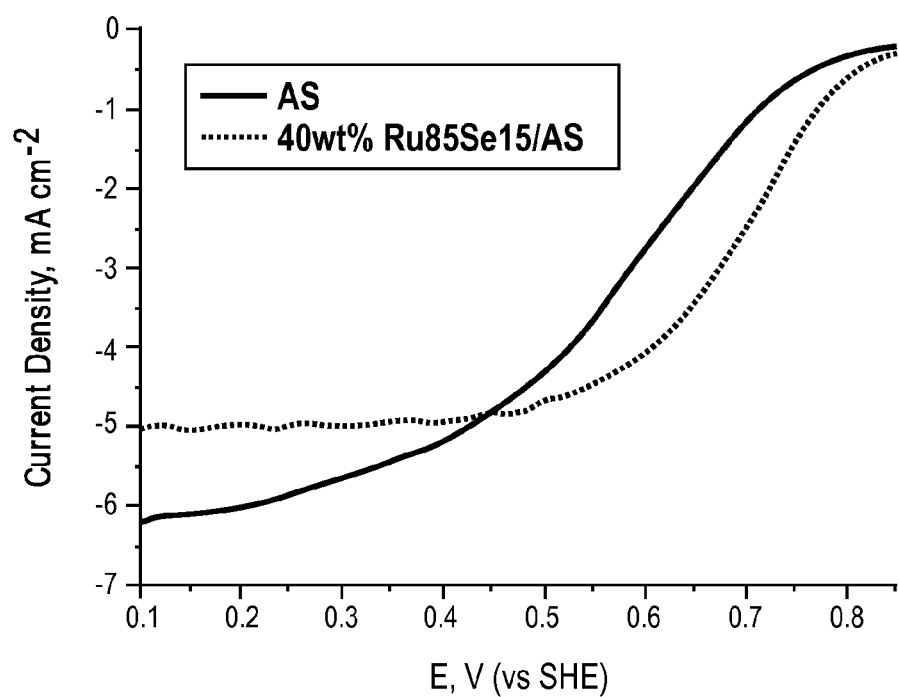
FIG. 23 shows RDE data for AS and 40 wt % $Ru_{85}Se_{15}$/AS in 0.5 M H₂SO₄ saturated with O₂ (catalysts loading: 600 mg cm⁻², 600 mg cm⁻², 1600 RPM, 10 mV s⁻¹).

An active support with $Ru_{85}Se_{15}$ was synthesized by following method. Active support from Example VII was impregnated with calculated amount if $RuCl_3$. Water was evaporated at T=85 C and material was reduced in $H_2$ atmosphere at T=200 C for 1 h. Ru/AS hybrid was impregnated with $H_2SeO_3$ and the resulting wet powder was heat treated in $H_2$ atmosphere at T=200 C for 1 h. FIG. 22 is an SEM image of $Ru_{85}Se_{15}$ catalyst supported on an AS. FIG. 23 shows RDE data for AS and 40 wt % $Ru_{85}Se_{15}$/AS in 0.5 M $H_2SO_4$ saturated with $O_2$ (catalysts loading: 600 mg cm$^{-2}$, 600 mg cm$^{-2}$, 1600 RPM, 10 mV s$^{-1}$). Table 1 shows the surface area of the $Ru_{85}Se_{15}$/AS catalyst.

VIII. Synthesis of an Active Support with Fe—C—N Catalyst (Fe—C—N/AS)

An active support Fe—C—N catalyst was synthesized by mechanochemical synthesis. 50 g of silica were mixed with 12.5 g of $Fe(NO_3)_3$ and 125 g Nicarbazin and ball-milled at 600 RPT for 2 hours. The fine powder was heat treated in $N_2$ atmosphere at T=900 C for 1 h. Silica was leeched by 20 wt % of HF and powder was washed with DI water until neutral pH. The dried powder was heat treated in $N_2$ atmosphere at T=975 C for 30 minutes.

IX. Synthesis of an Active Support with Pt Catalyst (Pt/AS)

Figure 24:
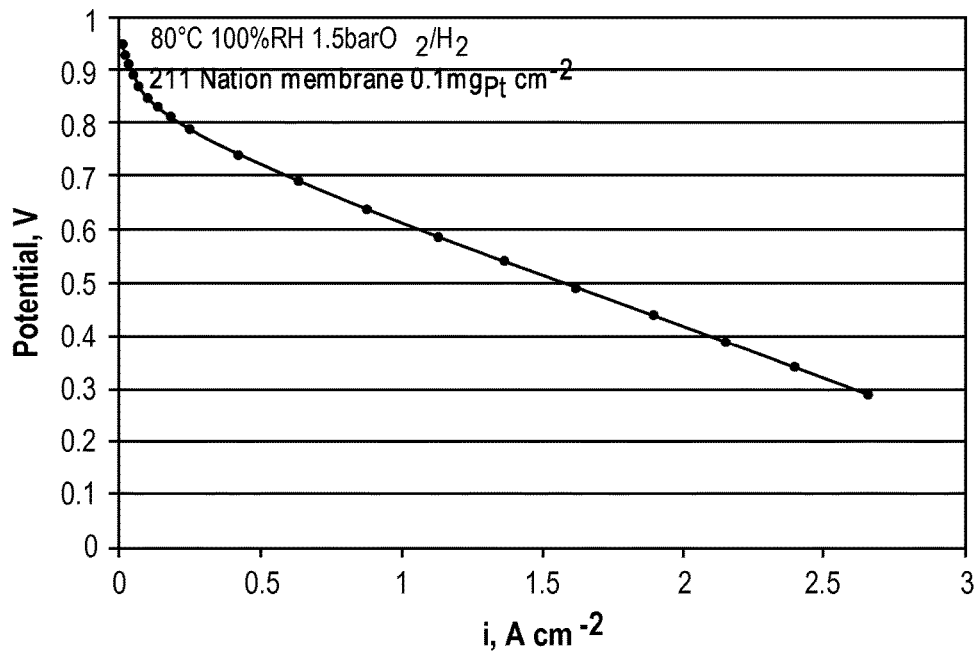
FIG. 24 shows VIR membrane electrode assembly performance data for materials made from Fe-Nicarbazin Active Support and 5 wt % Pt.
Figure 25:
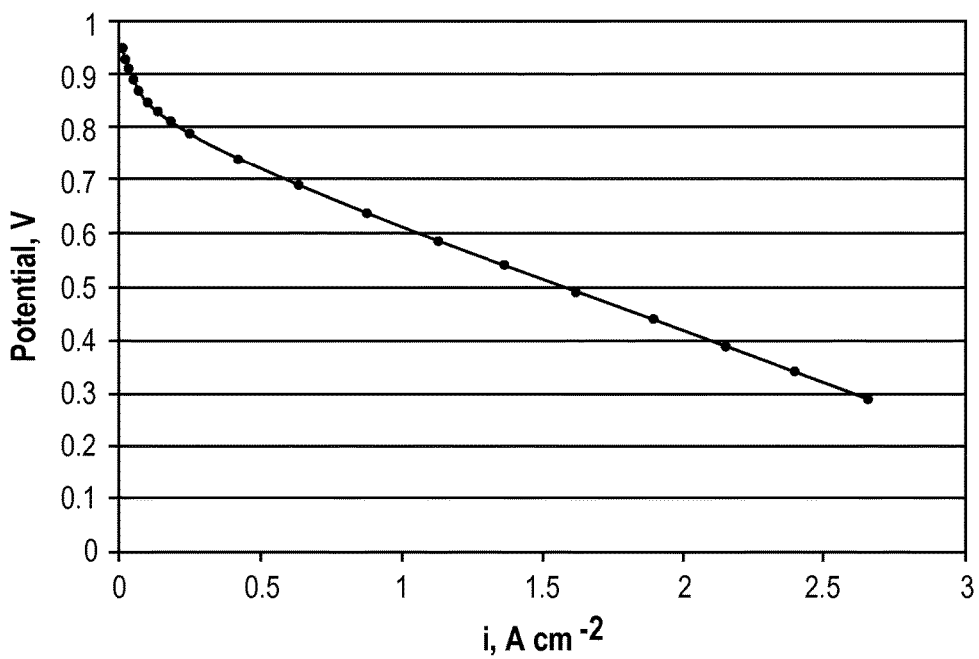
FIG. 25 shows VIR membrane electrode assembly performance data for materials made from Fe-Nicarbazin Active Support and 5 wt % Pt.

An active support with Pt catalyst was synthesized by following method. Active support from example VIII was impregnated (dry method) with calculated amount of $H_2PtCl_6$ precursor. Obtained composite material was heat treated in $H_2$ atmosphere at T=500 C for 1 h. The performance of the resulting catalyst only is illustrating in FIGS. 24 and 25. FIG. 24 shows VIR membrane electrode assembly performance data for materials made from Fe-Nicarbazin Active Support and 5 wt % Pt. FIG. 25 shows VIR membrane electrode assembly performance data for materials made from Fe-Nicarbazin Active Support and 5 wt % Pt. MEA is made from 211 membrane, 45 wt % Nafion, 25BC GDL at loading of 4 $mg_{catalyst}$cm$^{-2}$. testing at 80° C., 100% RH, 0.5 Bar $O_2$ backpressure.

TABLE 1

Surface area of prepared materials

| Catalyst | Precursors | Heat treatment conditions | Silica type | Surface area, m$^2$ g$^{-1}$ |
|---|---|---|---|---|
| Active Support (AS) | $Fe(NO_3)_3$, Aminoantipyrine (AAPyr) | 800 C., 3 h | EH5 | 673 |
| 2 wt % Pt 200 C./AS | $H_2PtCl_6$, AS | 200 C., 2 h | — | 567 |
| 20 wt % Pt 200 C./AS | $H_2PtCl_6$, AS | 200 C., 2 h | — | 420 |
| 20 wt % $Pd_3Co$ 300 C./Vulcan | $Pd(NO_3)_2$, $Co(NO_3)_2$, Vulcan | 300 C., 2 h | — | 69 |
| 20 wt % $Pd_3Co$ 300 C./AS | $Pd(NO_3)_2$, $Co(NO_3)_2$, AS | 300 C., 2 h | — | 274 |
| 40 wt % $Co_{85}Se_{15}$/Vulcan | $Co(NO_3)_2$, $H_2SeO_3$, Vulcan | 300 C., 2 h | — | 92 |
| 40 wt % $Co_{85}Se_{15}$/AS | $Co(NO_3)_2$, $H_2SeO_3$, AS | 300 C., 2 h | — | 186 |
| 30 wt % $Ru_{85}Se_{15}$/Vulcan | $RuCl_3$, $H_2SeO_3$, Vulcan | 300 C., 2 h | — | 120 |
| 30 wt % $Ru_{85}Se_{15}$/AS | $RuCl_3$, $H_2SeO_3$, AS | 300 C., 2 h | — | 393 |
| Fe-AAPyr/AS | $Fe(NO_3)_3$, Aminoantipyrine (AAPyr), AS | 700 C., 3 h | — | 470 |
| Fe-Phenanthroline/AS | $Fe(NO_3)_3$, phenanthroline, AS | 700 C., 3 h | — | 412 |

What is claimed is:

1. A method for forming a catalyst comprising:
   forming an active support by:
   combining metal-nitrogen-carbon (M-N—C) precursors and sacrificial template particles;
   allowing the M-N—C precursors to polymerize to produce a polymer;
   heat treating the polymer to form active sites in the polymer; and
   removing the sacrificial template particles to produce a porous active support; and
   decorating the active support with a catalytic material.

2. The method of claim 1 wherein the M-N—C precursors comprise one or more transition metal precursors and one or more precursors containing nitrogen and carbon.

3. The method of claim 2 wherein the transition metal precursor is a precursor of iron.

4. The method of claim 1 wherein heat treating comprises pyrolysis.

5. The method of claim 1 wherein the catalytic material is platinum or a platinum group metal.

6. The method of claim 5 wherein the catalytic material is platinum and the catalyst is loaded with less than 40 wt % platinum.

7. The method of claim 5 wherein the catalytic material is platinum and the catalyst is loaded with less than 20 wt % platinum.

8. The method of claim 5 wherein the catalytic material is platinum and the catalyst is loaded with less than 10 wt % platinum.

9. The method of claim 1 wherein the catalytic material is a platinum group metal.

10. The method of claim 1 wherein the catalytic material is a non-platinum group metal (non-PGM).

11. The method of claim 1 wherein the catalytic material is selected from the group consisting of Pt, RuCh, MCh, and bioenzymes; where M is a transition metal and Ch is S, Se, and/or Te.

12. The method of claim 1 wherein the catalytic material has a different catalytic pathway from the active sites in the polymer, such that two different catalytic pathways are present in the catalyst.

13. The method of claim 12 wherein one of the catalytic pathways is a four electron pathway and the other catalytic pathway is a two electron pathway.

14. A porous hybrid catalyst comprising:
   a porous support formed from metal, nitrogen, and carbon and containing a plurality of active sites dispersed throughout the support; and
   a catalytic material decorated on the surface of the porous support.

15. The porous hybrid catalyst of claim 14 wherein the catalytic material has a different catalytic pathway from the active sites in the porous support.

16. The porous hybrid catalyst of claim 14 wherein the metal in the porous support is a transition metal.

17. The porous hybrid catalyst of claim 16 wherein the transition metal is iron.

18. The porous hybrid catalyst of claim 14 wherein the catalytic material is selected from the group consisting of Pt, PdM, RuCh, MCh and bioenzymes; where M is a transition metal and Ch is S, Se, and/or Te.

19. The porous hybrid catalyst of claim 14 wherein the catalytic material has a different catalytic pathway from the active sites in the porous support, such that two different catalytic pathways are present in the catalyst.

20. The porous hybrid catalyst of claim 19 wherein one of the catalytic pathways is a four electron pathway and the other catalytic pathway is a two electron pathway.

* * * * *